United States Patent
Ryu

(10) Patent No.: US 10,139,643 B2
(45) Date of Patent: Nov. 27, 2018

(54) OLED DISPLAY HAVING SUB-PIXEL STRUCTURE THAT SUPPORTS 2D AND 3D IMAGE DISPLAY MODES

(71) Applicant: LG DISPLAY CO., LTD., Seoul (KR)

(72) Inventor: Ho Jin Ryu, Goyang-si (KR)

(73) Assignee: LG DISPLAY CO., LTD., Seoul (KR)

(*) Notice: Subject to any disclaimer, the term of this patent is extended or adjusted under 35 U.S.C. 154(b) by 215 days.

(21) Appl. No.: 14/542,014

(22) Filed: Nov. 14, 2014

(65) Prior Publication Data

US 2015/0145907 A1     May 28, 2015

(30) Foreign Application Priority Data

Nov. 26, 2013 (KR) .................. 10-2013-0144203

(51) Int. Cl.
| | |
|---|---|
| *G09G 3/3233* | (2016.01) |
| *G02B 27/26* | (2006.01) |
| *G09G 3/00* | (2006.01) |
| *G09G 3/20* | (2006.01) |
| *H04N 13/337* | (2018.01) |
| *H04N 13/356* | (2018.01) |

(52) U.S. Cl.
CPC ............ *G02B 27/26* (2013.01); *G09G 3/003* (2013.01); *G09G 3/207* (2013.01); *G09G 3/3233* (2013.01); *H04N 13/337* (2018.05); *H04N 13/356* (2018.05); *G09G 2300/0842* (2013.01); *G09G 2320/0209* (2013.01)

(58) Field of Classification Search
CPC .... H04N 13/0454; G02B 27/26; G09G 3/001; G09G 3/00; G09G 3/207

USPC ......................................................... 345/697
See application file for complete search history.

(56) References Cited

U.S. PATENT DOCUMENTS

| | | | |
|---|---|---|---|
| 2002/0070909 A1* | 6/2002 | Asano ................. | G09G 3/3233 345/76 |
| 2012/0162208 A1* | 6/2012 | Park ................... | H04N 13/0404 345/419 |
| 2012/0274748 A1 | 11/2012 | Hwang et al. | |
| 2012/0280979 A1* | 11/2012 | Hwang ................. | G02B 27/26 345/419 |
| 2013/0016089 A1* | 1/2013 | Kim ....................... | G02B 27/26 345/212 |

(Continued)

FOREIGN PATENT DOCUMENTS

| | | |
|---|---|---|
| CN | 102654701 A | 9/2012 |
| CN | 102760418 A | 10/2012 |

(Continued)

*Primary Examiner* — Yuzhen Shen
(74) *Attorney, Agent, or Firm* — Birch, Stewart, Kolasch & Birch, LLP

(57) ABSTRACT

Discussed is an organic light emitting display device. The organic light emitting display device can include an organic light emitting panel in which a main organic light emitting diode (OLED) which emits light in a two-dimensional (2D) mode and a three-dimensional (3D) mode and an auxiliary OLED which emits light in only the 2D mode are disposed in each of a plurality of sub-pixels, a panel driver configured to drive the organic light emitting panel, and a patterned retarder bonded to the organic light emitting panel, and configured to change polarizing characteristics of a left image and a right image which are output from the organic light emitting panel.

14 Claims, 5 Drawing Sheets

(56) References Cited

U.S. PATENT DOCUMENTS

| | | | |
|---|---|---|---|
| 2013/0084531 A1* | 4/2013 | Hamaguchi | H01L 51/0018 430/319 |
| 2013/0128173 A1* | 5/2013 | Wu | G09G 5/00 349/43 |
| 2013/0207946 A1* | 8/2013 | Kim | G09G 3/3225 345/204 |
| 2013/0235019 A1* | 9/2013 | Kim | G09G 5/14 345/212 |
| 2013/0235021 A1* | 9/2013 | Maeda | G09G 3/003 345/212 |
| 2014/0319486 A1* | 10/2014 | Hong | G09G 3/32 257/40 |
| 2014/0339508 A1* | 11/2014 | Hong | H01L 27/3258 257/40 |
| 2014/0347261 A1 | 11/2014 | Xue et al. | |
| 2014/0354704 A1* | 12/2014 | Pak | G09G 3/3291 345/690 |
| 2015/0015468 A1* | 1/2015 | Ko | G09G 3/3233 345/82 |
| 2015/0332628 A1* | 11/2015 | Ren | G09G 3/3258 345/690 |

FOREIGN PATENT DOCUMENTS

| | | |
|---|---|---|
| CN | 163257495-7 | 8/2013 |
| KR | 10-2013-0022811 A | 3/2013 |
| KR | 10-2013-0036680 A | 4/2013 |

\* cited by examiner

OLED DISPLAY HAVING SUB-PIXEL STRUCTURE THAT SUPPORTS 2D AND 3D IMAGE DISPLAY MODES

CROSS-REFERENCE TO RELATED APPLICATIONS

This application claims the priority benefit of the Korean Patent Application No. 10-2013-0144203 filed on Nov. 26, 2013, which is hereby incorporated by reference as if fully set forth herein.

BACKGROUND OF THE INVENTION

Field of the Invention

The present invention relates to an organic light emitting display device, and more particularly, to an organic light emitting display device for displaying a three-dimensional (3D) image and a method of driving the same.

Discussion of the Related Art

A flat panel display (FPD) device is applied to various electronic devices such as portable phones, tablet personal computers (PCs), notebook computers, monitors, etc. Examples of the FPD device include liquid crystal display (LCD) devices, plasma display panel (PDP) devices, organic light emitting display devices, etc. Recently, electrophoretic display (EPD) devices are being widely used as one type of the FPD device.

Among the display devices, the organic light emitting display devices use a self-emitting element, and thus have a fast response time, high emission efficiency, high luminance, and a broad viewing angle.

The organic light emitting display devices may display a three-dimensional (3D) image. The organic light emitting display devices three-dimensionally display an image by using characteristic where a sense of perspective is shown in combining different image signals discerned by two eyes.

A stereoscopic technique, a volumetric technique, and a holographic technique are known as methods of realizing a 3D image in the organic light emitting display devices.

Among these techniques, the stereoscopic technique is categorized into a glasses technique and a glasses-free technique. The glasses technique is again categorized into a polarized glasses technique and a shutter glasses technique. The polarized glasses technique is a method that changes the polarizing directions of a left image and a right image which are displayed in an organic light emitting display device, and displays an image in a polarized glasses direction. The shutter glasses technique is a method in which polarized glasses temporally divide and receive a left image and a right image which are displayed in an organic light emitting display device.

FIG. 1 is a plan view of an organic light emitting panel applied to a related art organic light emitting display device using the polarized glasses technique.

As illustrated in FIG. 1, a plurality of sub-pixels which display red, green, or blue are formed in a related art organic light emitting panel 10 using the polarized glasses technique. An emission part 21 which displays an image and a black stripe 22 which cannot display an image are formed in each of the plurality of sub-pixels. Also, a bank part including a plurality of banks which divide the sub-pixels is formed between the sub-pixels.

The emission part 21 may be one selected from a red organic light emitting diode (OLED) R, a green OLED G, and a blue OLED B depending on an emitted color.

A red sub-pixel including the red OLED, a green sub-pixel including the green OLED, and a blue sub-pixel including the blue OLED constitute one unit pixel (hereinafter simply referred to as a pixel).

The bank part defines the emission part 21. The bank part prevents optical and electrical interference from occurring between adjacent the emission parts 21.

In a 3D mode, the organic light emitting panel 10 alternately displays a left image and a right image in units of a horizontal line. For example, when left images are output to odd-numbered horizontal lines, right images are output to even-numbered horizontal lines.

Moreover, although not shown, a polarizing layer including a patterned retarder is disposed at a front surface of the organic light emitting panel 10. The polarizing layer changes a polarizing characteristic of the left image and a polarizing characteristic of the right image, and supplies the left image and the right image to polarized glasses.

The related art organic light emitting display device using the polarized glasses technique, crosstalk based on a viewing angle occurs. To solve such a problem, as illustrated in FIG. 1, the black stripe (BS) 22 which cannot output light is formed at a portion of the pixel 20.

Therefore, in the related art organic light emitting display device in which the black stripe 22 is formed, crosstalk based on a viewing angle can be prevented from occurring in the 3D mode. However, in a two-dimensional (2D) mode, an aperture ratio is reduced, and for this reason, luminance is lowered.

To provide an additional description, in the related art organic light emitting display device using the polarized glassed technique, when an area of the black stripe 22 is enlarged, a viewing angle is broadened in viewing a 3D image. Therefore, a user can view a sharper 3D image at a broader up/down viewing angle. However, when the user views a 2D image by using the organic light emitting display device (a 3D display device) using the polarized glassed technique, a dark image which is reduced by a width of the black stripe 22 is viewed.

SUMMARY OF THE INVENTION

Accordingly, the present invention is directed to provide an organic light emitting display device and a method of driving the same that substantially obviate one or more problems due to limitations and disadvantages of the related art.

An aspect of the present invention is directed to provide a 3D image display device and a method of driving the same, in which a main OLED which emits light in both a 2D mode and a 3D mode and an auxiliary OLED which emits light in only the 2D mode are formed in each sup-pixel which is formed in a panel.

Additional advantages and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these and other advantages and in accordance with the purpose of the invention, as embodied and broadly described herein, there is provided in one example an organic light emitting display device including: an organic light emitting panel in which a main organic light emitting diode (OLED) which emits light in a two-dimensional (2D)

mode and a three-dimensional (3D) mode and an auxiliary OLED which emits light in only the 2D mode are disposed in each of a plurality of sub-pixels; a panel driver configured to drive the organic light emitting panel; and a patterned retarder bonded to the organic light emitting panel, and configured to change polarizing characteristics of a left image and a right image which are output from the organic light emitting panel.

In another aspect of the present invention, there is provided a method of an organic light emitting display device including: in a two-dimensional (2D) mode, supplying a driving current to a main anode of a main organic light emitting diode (OLED) formed in a sub-pixel and an auxiliary anode of an auxiliary OLED formed in the sub-pixel to emit light from the main OLED and the auxiliary OLED; and in a three-dimensional (3D) mode, supplying the driving current to the main anode to emit light from the main OLED, and preventing the driving current from being supplied to the auxiliary anode.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE INVENTION

Reference will now be made in detail to the exemplary embodiments of the present invention, examples of which are illustrated in the accompanying drawings. Wherever possible, the same reference numbers will be used throughout the drawings to refer to the same or like parts.

As described above, the present invention relates to an organic light emitting display device displaying a 3D image by using the polarized glasses technique, and technology which may be used in part in the present invention is disclosed in Korean Patent Publication No. 10-2013-0036680.

Hereinafter, embodiments of the present invention will be described in detail with reference to the accompanying drawings.

Figure 1:
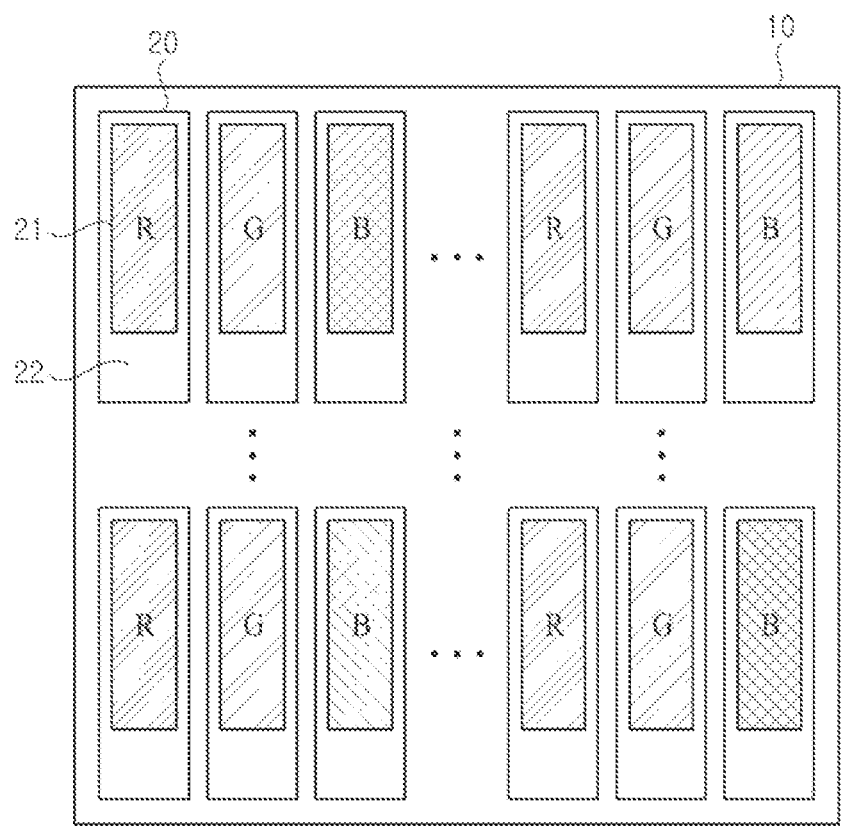
FIG. 1 is a plan view of an organic light emitting panel applied to a related art organic light emitting display device using the polarized glasses technique.
Figure 2:
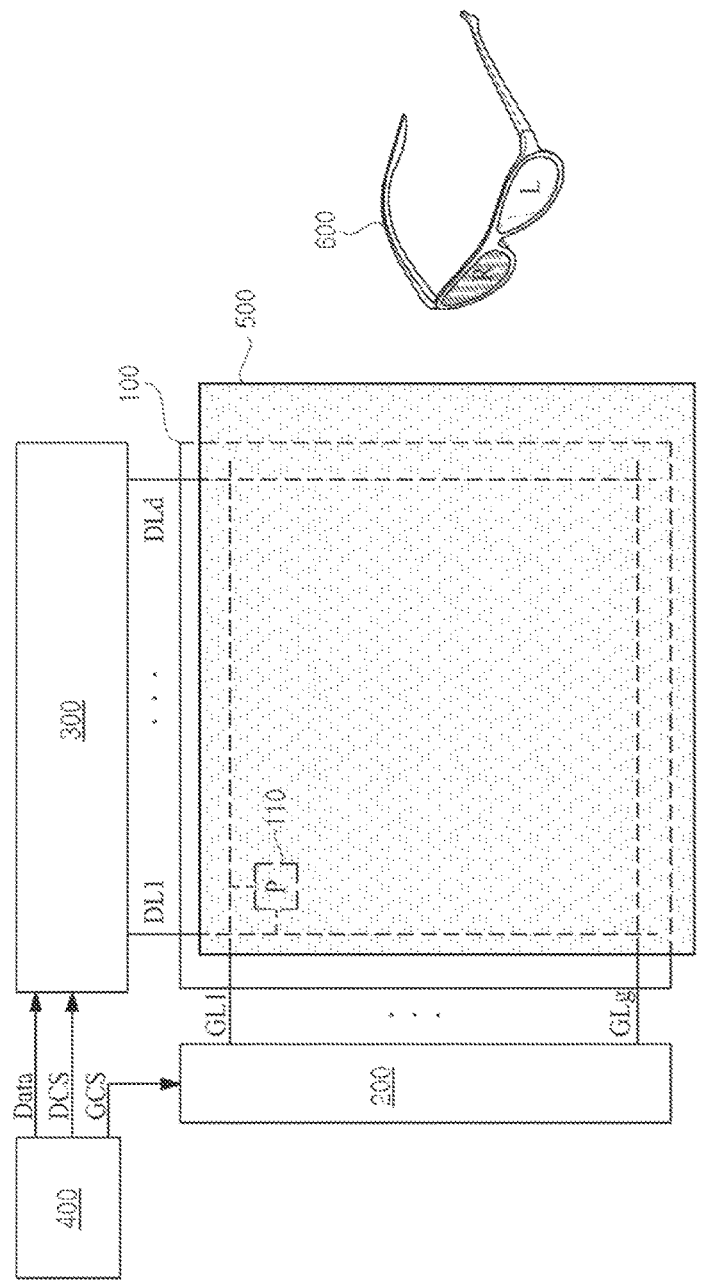
FIG. 2 is an exemplary diagram illustrating a configuration of an organic light emitting display device according to an embodiment of the present invention.

FIG. 2 is an exemplary diagram illustrating a configuration of an organic light emitting display device according to an embodiment of the present invention.

As illustrated in FIG. 2, the organic light emitting display device according to an embodiment of the present invention includes: an organic light emitting panel 100 in which a sub-pixel (P) 110 is formed in each of a plurality of intersection areas between a plurality of gate lines GL1 to GLg and a plurality of data lines DL1 to DLd; a gate driver 200 which sequentially supplies a scan pulse to the plurality of gate lines GL1 to GLg formed in the organic light emitting panel 100; a data driver 300 which respectively supplies data voltages to the plurality of data lines DL1 to DLd formed in the organic light emitting panel 100; a timing controller 400 which controls a function of the gate driver 200 and a function of the data driver 300; and a patterned retarder 500 which is bonded to the organic light emitting panel 100, and changes the polarizing characteristics of a left image and a right image which are output from the organic light emitting panel 100. A generic name for the timing controller 400, the gate driver 200, and the data driver 300 is simply referred to as a panel driver. The panel driver drives the organic light emitting panel 100.

The organic light emitting panel 100 outputs a 2D image in a 2D mode, and outputs a 3D image in a 3D mode.

In the organic light emitting panel 100, the sub-pixel (P) 110 is formed in each of a plurality of areas defined by intersections between the plurality of gate lines GL and the plurality of data lines DL.

First, the sub-pixel 110 includes a main OLED which emits light in both the 2D mode and the 3D mode, an auxiliary OLED which emits light in only the 2D mode, and a driver which drives the main OLED and the auxiliary OLED.

In the organic light emitting panel 100, a left image and a right image are alternately output in units of a horizontal line in the 3D mode. For example, when left images are output to odd-numbered horizontal lines, right images are output to even-numbered horizontal lines.

To this end, in the organic light emitting panel 100, a plurality of left eye sub-pixels and a plurality of right eye sub-pixels are formed on different horizontal lines.

The sub-pixel 110 may be one selected from a red sub-pixel which outputs red, a green sub-pixel which outputs green, and a blue sub-pixel which outputs blue.

The red sub-pixel, the green sub-pixel, and the blue sub-pixel constitute one unit pixel (hereinafter simply referred to as a pixel).

Here, each of a plurality of the sub-pixels 110 may output one color selected from red, green, and blue, but all the sub-pixels 110 may output white light. In this case, a color filter may be formed at an upper end of the organic light emitting panel 100.

Second, the main OLED and the auxiliary OLED are formed in a top emission type in which emitted light is output to the outside through an upper substrate.

The main OLED includes a main anode, a light emitting material part formed on the main anode, and a cathode formed on the light emitting material part.

The auxiliary OLED includes an auxiliary anode which is electrically isolated from the main anode, and shares the light emitting material part and the cathode with the main OLED.

The plurality of sub-pixels 110 are divided by a bank. The main anode and the auxiliary anode output light with a current which is applied thereto through a driving transistor (TFT) which is formed in the driver. An upper substrate is bonded to an upper end of the cathode.

Third, the driver includes a storage capacitor and at least two or more transistors which are connected to a corresponding data line DL and a corresponding gate line GL, and control emission of light from the main OLED and the auxiliary OLED.

The main anode configuring the main OLED and the auxiliary anode configuring the auxiliary OLED are connected to a first power source, and the cathode configuring the main OLED and the auxiliary OLED is connected to a second power source. The main OLED and the auxiliary OLED emits light having certain luminance in response to a current supplied from the driving transistor which is formed in the driver.

When the scan pulse is supplied to the gate line GL, the driver controls an amount of current supplied to the OLED according to a data voltage supplied through the data line DL.

To this end, the driving transistor is connected between the first power source and the main anode and auxiliary anode, and a switching transistor is connected between the driving transistor and the data line DL and gate line GL.

Hereinafter, a structure of the sub-pixel 110, detailed configurations and functions of the main OLED and the auxiliary OLED, and a structure of the driver will be described in detail with reference to FIGS. 3 to 5.

The timing controller 400 outputs a gate control signal GCS for controlling the gate driver 200 and a data control signal DCS for controlling the data driver 300, by using a vertical sync signal, a horizontal sync signal, and a clock which are supplied from an external system.

The timing controller 400 samples and realigns input image data supplied from the external system, and supplies the realigned digital image data to the data driver 300.

That is, the timing controller 400 realigns the input image data supplied from the external system, and transfers the realigned digital image data to the data driver 300. Also, the timing controller 400 generates the gate control signal GCS for controlling the gate driver 200 and the data control signal DCS for controlling the data driver 300, by using the clock, the horizontal sync signal, the vertical sync signal, and a data enable signal which are supplied from the external system, and respectively transfers the gate control signal and the data control signal to the gate driver 200 and the data driver 300. Here, the clock, the horizontal sync signal, and the vertical sync signal are simply referred to as a timing signal.

Particularly, in order to achieve the above-described object(s), the timing controller 400 may include: a receiver that receives the input image data and the above-described various signals from the external system; an image data processor that realigns the input image data received from the receiver so as to be suitable for the panel, and generates the realigned digital image data; a control signal generator that generates the gate control signal GCS for controlling the gate driver 200 and the data control signal DCS for controlling the data driver 300, by using the signals received from the receiver; and a transferor that outputs the image data, generated by the image data processor, to the data driver 300, and respectively outputs the gate control signal and the data control signal to the gate driver 200 and the data driver 300.

Moreover, the timing controller 400 transfers a control signal to a switching unit which is provided in each of the plurality of sub-pixels 110.

In the 2D mode, the switching unit controls the main OLED and the auxiliary OLED so that both the main OLED and the auxiliary OLED emit light. In the 3D mode, the switching unit controls the main OLED and the auxiliary OLED so that only the main OLED emits light, and the auxiliary OLED does not emit light.

Moreover, in the 3D mode, the timing controller 400 realigns the input image data so that a left image and a right image are output in units of a horizontal line.

A method in which a 2D image and a 3D image are output by the timing controller 400 and the data driver 300 may use a general method which is disclosed at present, and thus, its detailed description is not provided.

The data driver 300 converts the image data, input from the timing controller 400, into analog data voltages, and respectively supplies the data voltages of one horizontal line to the data lines at every horizontal line in which the scan pulse is supplied to a corresponding gate line. That is, the data driver 300 converts the image data into the data voltages by using gamma voltages supplied from a gamma voltage generator (not shown), and respectively outputs the data voltages to the data lines.

That is, the data driver 300 shifts a source start pulse SSP from the timing controller 400 according to a source shift clock SSC to generate a sampling signal. The data driver 300 latches the image data, input according to the source shift clock SSC, according to the sampling signal to convert the image data into the data voltages, and respectively supplies the data voltages to the data lines in units of a horizontal line in response to a source output enable signal SOE.

To this end, the data driver 300 may include a shift register, a latch, a digital-to-analog converter (DAC), and an output buffer.

The shift register outputs the sampling signal by using the data control signal received from the timing controller 400.

The latch latches the digital image data which are sequentially received from the timing controller 400, and simultaneously outputs the latched image data to the DAC.

The DAC converts the image data, transferred from the latch, into the data voltages, and outputs the data voltages. That is, the DAC converts the image data into the data voltages by using the gamma voltages supplied from the gamma voltage generator (not shown), and respectively outputs the data voltages to the data lines.

The output buffer respectively outputs the data voltages, transferred from the DAC, to the data lines DL of the panel according to the source output enable signal SOE transferred from the timing controller 400.

The gate driver 200 sequentially supplies the scan pule to the gate lines GL1 to GLg of the panel 100 in response to the gate control signal input from the timing controller 400. Therefore, a plurality of switching transistors which are respectively formed in a plurality of sub-pixels 110 of a corresponding horizontal line receiving the scan pulse are turned on, and an image is output to each of the plurality of sub-pixels 110.

That is, the gate driver 200 shifts a gate start pulse GSP transferred from the timing controller 400 according to a gate shift clock GSC, and sequentially supplies the scan pulse having a gate-on voltage to the gate lines GL1 to GLg. The gate driver 200 supplies a gate-off voltage to the gate lines GL1 to GLg during the other period in which the scan pulse is not supplied.

The gate driver 200 may be provided independently from the panel 100, and may be provided in a type which is electrically connected to the panel 100 by various methods. However, the gate driver 200 may be provided in a gate-in panel (GIP) type which is equipped in the panel 100. In this case, examples of the gate control signal for controlling the gate driver 200 may include a start signal VST and a gate clock GCLK.

Hereinabove, the data driver 300, the gate driver 200, and the timing controller 400 have been described as being separately provided. However, at least one selected from the data driver 300 and the gate driver 200 may be provided as one body with the timing controller 400. Hereinafter, a generic name for the gate driver 200, the data driver 300, and the timing controller 400 is referred to as a panel driver.

Finally, the patterned retarder 500 changes the polarizing directions of a left image and a right image which constitute a 3D image, and outputs the left image and the right image. That is, the patterned retarder 500 changes a vibration direction of light output from the organic light emitting panel 100.

The patterned retarder 500 is divided into a plurality of left eye patterned retarders and a plurality of right eye patterned retarders. Each of the left eye patterned retarders is disposed in correspondence with a left eye sub-pixel which is formed in the organic light emitting panel 100, and each of the right eye patterned retarders is disposed in correspondence with a right eye sub-pixel which is formed in the organic light emitting panel 100.

Here, the left eye patterned retarder and the right eye patterned retarder have different light axes, and change a vibration direction of light, output from the organic light emitting panel 100, to different directions.

That is, a direction of a light axis of light passing through the left eye patterned retarder differs from a direction of a light axis of light passing through the right eye patterned retarder.

The patterned retarder 500 may use a patterned retarder which is generally used at present. For example, the patterned retarder 500 may include a release film, an adhesive, an alignment layer (RM), a low haze TAC, and a protective layer. Therefore, a detailed description on the patterned retarder 500 is not provided.

Light output from the patterned retarder 500 is input to a user's eyes through a polarized glasses 600. Therefore, the user can view a 3D image.

Figure 3:
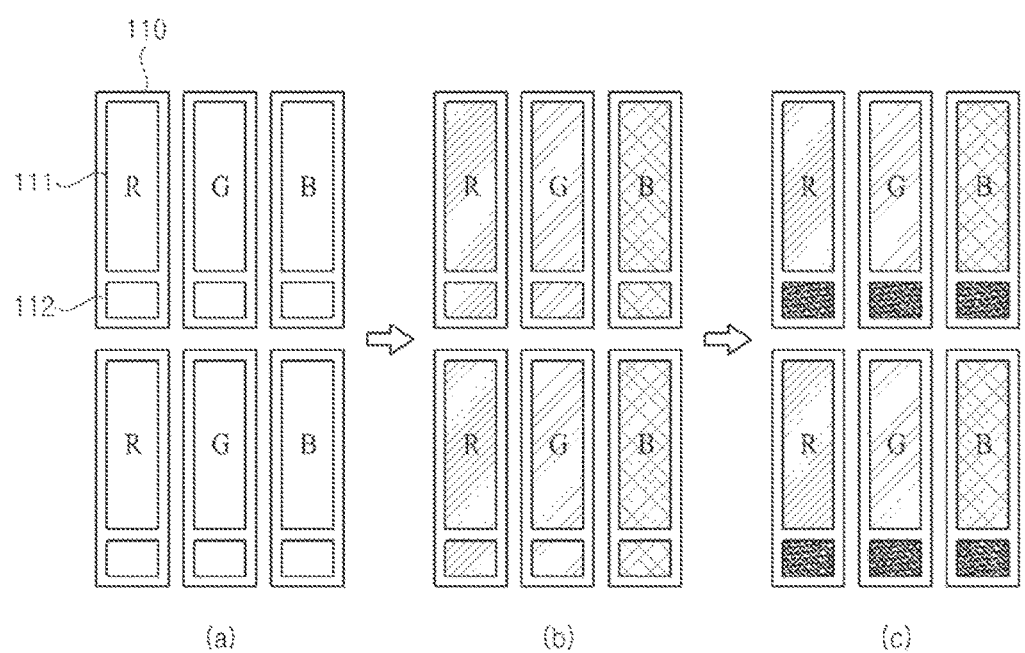
FIG. 3 is an exemplary diagram illustrating configurations of sub-pixels applied to an organic light emitting display device according to an embodiment of the present invention.

FIG. 3 is an exemplary diagram illustrating configurations of sub-pixels applied to an organic light emitting display device according to an embodiment of the present invention. FIG. 4 is an exemplary diagram illustrating a configuration of a driver which is provided in each of the sub-pixels of FIG. 3. FIG. 5 is an exemplary diagram illustrating a cross-sectional structure of each sub-pixel of FIG. 3.

The sub-pixel 110 applied to the organic light emitting display device according to an embodiment of the present invention, as illustrated in FIGS. 3(a)-3(c) and 4, includes: a driver 115 which is provided in an intersection area between a gate line GL and a data line DL, and includes a plurality of transistors TR1 to TR3; a main OLED 111 which emits light with a driving current supplied from the driver 115; an auxiliary OLED 112 which emits light with the driving current, and shares a cathode with the main OLED 115; and a switching unit 116 which prevents the driving current from being supplied to the auxiliary OLED 112 in the 3D mode, and supplies the driving current to the auxiliary OLED 112 in the 2D mode, according to a control signal transferred from the panel driver 400.

As illustrated in FIG. 4(a), the driver 115 may include: a driving transistor TR1 which is connected between a high-level voltage VDD terminal and a low-level voltage VSS terminal, and drives the main OLED 111 and the auxiliary OLED 112; a switching transistor TR2 that is connected between the driving transistor TR1 and the data line DL, and is turned on by the scan pulse supplied through the gate line GL; and a capacitor C which is connected to the main OLED 111 and a node which is disposed between the switching transistor TR2 and the driving transistor TR1.

The driver 115 may further include a plurality of transistors for compensating for a deterioration of the main OLED 111 or the auxiliary OLED 112, or sensing deterioration information.

A detailed configuration and function of the driver 115 are the same as those of a driver which is provided in a sub-pixel of an organic light emitting display device which is generally used at present, and thus, their detailed descriptions are not provided.

Since the main OLED 111 and the auxiliary OLED 112 are driven in the top emission type, the driver 115 may be provided to overlap the main OLED 111 and the auxiliary OLED 112, in the sub-pixel 110.

Figure 4:
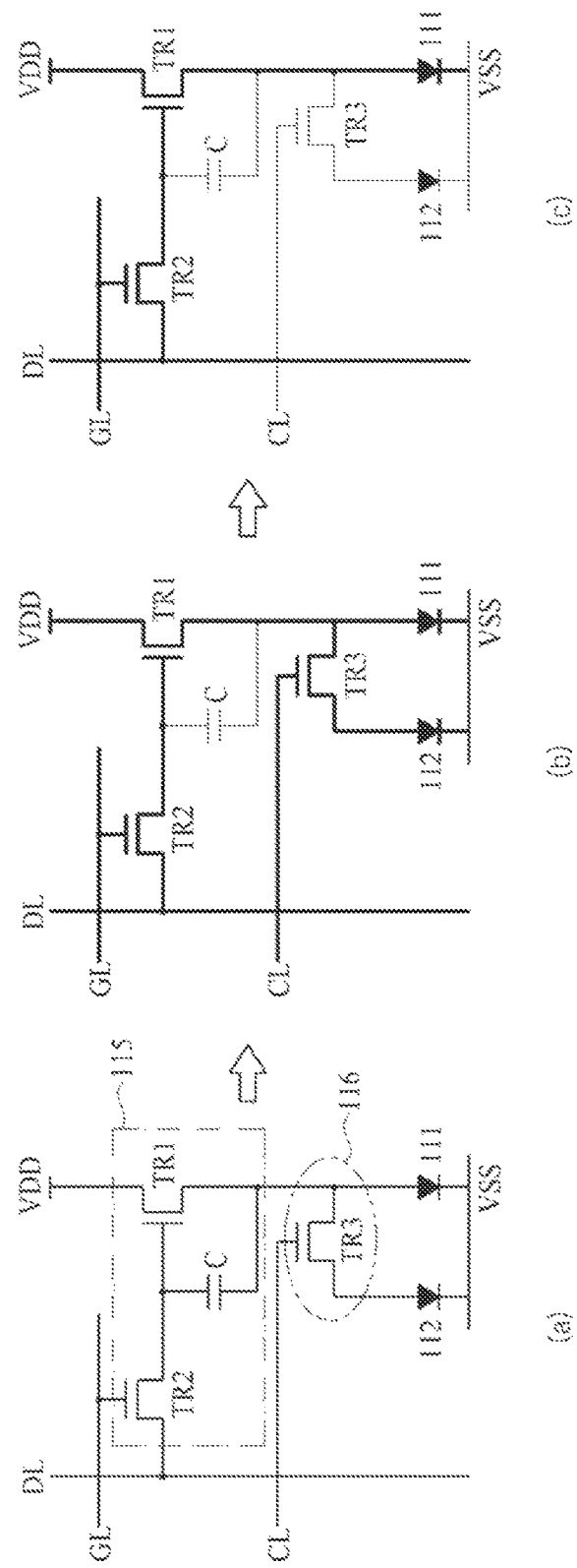
FIG. 4 is an exemplary diagram illustrating a configuration of a driver which is provided in each of the sub-pixels of FIG. 3.
Figure 5:
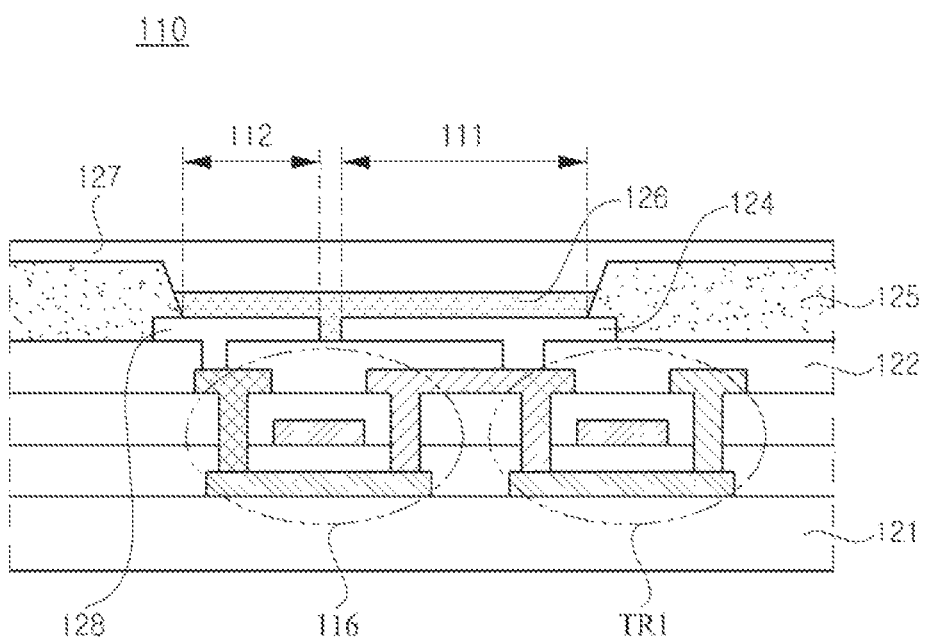
FIG. 5 is an exemplary diagram illustrating a cross-sectional structure of each sub-pixel of FIG. 3.

As illustrated in FIG. 4(a) and FIG. 5, the switching unit 116 is disposed between a main anode 124 configuring the main OLED 111 and an auxiliary anode 128 configuring the auxiliary OLED 112.

The switching unit 116 prevents the driving current from being supplied to the auxiliary OLED 112 in the 3D mode, and supplies the driving current to the auxiliary OLED 112 in the 2D mode, according to the control signal CS transferred from the panel driver 400, and particularly, the timing controller 400.

The control signal CS is transferred to the switching unit 116 through a control signal line CL illustrated in FIG. 4.

That is, the main anode 124 and the auxiliary anode 126 are electrically isolated from each other by the switching unit 116, and the switching unit 116 electrically connects the main anode 124 to the auxiliary anode 128 or electrically isolates the main anode 124 from the auxiliary anode 128 according to the control signal CS transferred from the panel driver 400, and particularly, the timing controller 400.

The switching unit 116, as illustrated in FIG. 4(a) and FIG. 5, may be configured with a thin film transistor (TFT) T3.

Finally, the main OLED 111 and the auxiliary OLED 112 shares one cathode 127.

In the 2D mode, the main OLED 111 and the auxiliary OLED 112 simultaneously emit light with a driving current transferred from the driver which is provided in the sub-pixel 110. Also, in the 3D mode, the main OLED 111 emits light with the driving current, and the driving current is not supplied to the auxiliary OLED 112.

The main anode 124 configuring the main OLED 111 is directly connected to the driver 115, and the auxiliary anode 128 configuring the auxiliary OLED 112 is connected to the driver 115 and the main anode 124 through the switching unit 116.

The main OLED 111 includes the main anode 124, a light emitting material part 126 formed on the main anode 124, and a cathode 127 formed on the light emitting material part 126.

The auxiliary OLED 112 includes an auxiliary anode 128 which is electrically isolated from the main anode 124, and shares the light emitting material part 126 and the cathode 127 with the main OLED 111. That is, the cathode 127 configuring the auxiliary OLED 112 is the same as the cathode 127 configuring the main OLED 111.

A configuration of the main OLED 111 and a configuration of the auxiliary OLED 112 will be described in detail with reference to FIG. 5.

First, as illustrated in FIG. 5, the main OLED 111 includes a substrate 121, a plurality of insulating layers 122 which are stacked on the substrate 121, the main anode 124, a light emitting material part 126 which is stacked on the main anode 124, and the cathode 127 which is stacked on the light emitting material part 126.

The substrate 121 may be formed of a glass substrate, or may be formed of a synthetic resin substrate or a synthetic resin film.

The plurality of insulating layers 122 insulates various electrodes included in the driver 115.

For example, as illustrated in FIG. 5, the driving transistor TR1 configuring the driver 115, a transistor T3 used as the switching unit 116, and the plurality of insulating layers which insulate a gate, a source, and a drain of each of the transistors are formed under the main anode 124. In FIG. 5, only one of the plurality of insulating layers is referred to by reference numeral 122. The plurality of insulating layers may be formed of various materials such as $SiO_2$, SiNx, and SiOx.

The main anode 124 is formed of a conductive material, and particularly, may be formed of a material having a reflection function so as to reflect light, emitted from the light emitting material part 126, in the cathode 127 direction. For example, the main anode 124 may be formed of metal such as aluminum (Al), tantalum (Ta), and silver (Ag).

The light emitting material part 126 may include a hole transport layer (HTL), an emission material layer (EML), and an electron transport layer (ETL).

In order to enhance an emission efficiency of the light emitting material part 126, a hole injection layer (HIL) may be formed between the main anode 124 and the HTL, and an electron injection layer (EIL) may be formed between the cathode 127 and the ETL.

The cathode 127 outputs light, emitted from the light emitting material part 126, to the outside.

The cathode 127 may be formed of indium tin oxide (ITO), or may be formed of a transparent metal thin layer. The transparent metal thin layer may be an aluminum thin layer. For example, when the aluminum thin layer is formed to a thickness of 20 nm or less, the aluminum thin layer has a transmittance of 50% to 70%. Therefore, the cathode 127 may be formed a transparent metal thin layer having a light transmittance of 50% to 70%.

The main OLED 111 is formed in the top emission type where light is output to the outside through the cathode 127. In the main OLED 111, when a positive (+) voltage and a negative (−) voltage are respectively applied to the main anode 124 and the cathode 127, a positive hole of the main anode 124 and an electron of the cathode 127 are transferred to the EML, and thus, an exciton is generated. When the exciton is shifted from an excited state to a ground state, light is generated, and the light is emitted as visible light through the EML and the cathode 127.

Second, as illustrated in FIG. 5, the auxiliary OLED 112 includes a substrate 121, a plurality of insulating layers 122 which are stacked on the substrate 121, the auxiliary anode 128, a light emitting material part 126 which is stacked on the auxiliary anode 128, and the cathode 127 which is stacked on the light emitting material part 126.

The substrate 121 may be formed of a glass substrate, or may be formed of a synthetic resin substrate or a synthetic resin film.

The plurality of insulating layers 122 insulates various electrodes included in the driver 115.

For example, as illustrated in FIG. 5, the driving transistor TR1 configuring the driver 115, a transistor T3 used as the switching unit 116, and the plurality of insulating layers which insulate a gate, a source, and a drain of each of the transistors are formed under the auxiliary anode 128. In FIG. 5, only one of the plurality of insulating layers is referred to by reference numeral 122. The plurality of insulating layers may be formed of various materials such as $SiO_2$, SiNx, and SiOx.

The auxiliary anode 128 is formed of a conductive material, and particularly, may be formed of a material having a reflection function so as to reflect light, emitted from the light emitting material part 126, in the cathode 127 direction. For example, the auxiliary anode 128 may be formed of metal such as aluminum (Al), tantalum (Ta), and silver (Ag).

The auxiliary anode 128, as illustrated in FIG. 5, is isolated from the main anode 124. However, the auxiliary anode 128 may be electrically connected to the main anode 124 through the switching unit 116.

The light emitting material part 126 may include a hole transport layer (HTL), an emission material layer (EML), and an electron transport layer (ETL).

In order to enhance an emission efficiency of the light emitting material part 126, a hole injection layer (HIL) may be formed between the main anode 124 and the HTL, and an electron injection layer (EIL) may be formed between the cathode 127 and the ETL.

The light emitting material part 126 configuring the auxiliary OLED 112 is the same as the light emitting material part 126 configuring the main OLED 111. That is, the auxiliary OLED 112 and the main OLED 111 share the light emitting material part 126.

The cathode 127 outputs light, emitted from the light emitting material part 126, to the outside.

The cathode 127 may be formed of indium tin oxide (ITO), or may be formed of a transparent metal thin layer. The transparent metal thin layer may be an aluminum thin layer. For example, when the aluminum thin layer is formed to a thickness of 20 nm or less, the aluminum thin layer has a transmittance of 50% to 70%. Therefore, the cathode 127 may be formed a transparent metal thin layer having a light transmittance of 50% to 70%.

The cathode 127 configuring the auxiliary OLED 112 is the same as the cathode 127 configuring the main OLED 111. That is, the auxiliary OLED 112 and the main OLED 127 share the cathode 127.

The main OLED 127 and the auxiliary OLED 112 share the light emitting material part 126 and the cathode 127, but a separate partition wall is not formed between the main OLED 127 and the auxiliary OLED 112.

That is, the main OLED 127 and the auxiliary OLED 112 are formed in one sub-pixel 110, and emit light of the same color in the 2D mode. Therefore, the main OLED 127 and the auxiliary OLED 112 may not be separated from each other by a partition wall.

Moreover, in the 3D mode, only the main OLED 111 emits light, and the auxiliary OLED 112 does not emit light. Therefore, the main OLED 127 and the auxiliary OLED 112 may not be separated from each other by the partition wall.

The auxiliary OLED 112 is formed in the top emission type where light is output to the outside through the cathode 127. In the auxiliary OLED 112, when a positive (+) voltage and a negative (−) voltage are respectively applied to the auxiliary anode 128 and the cathode 127, a positive hole of the auxiliary anode 128 and an electron of the cathode 127 are transferred to the EML, and thus, an exciton is generated. When the exciton is shifted from an excited state to a ground state, light is generated, and the light is emitted as visible light through the EML and the cathode 127.

An upper substrate for sealing the main OLED 111 and the auxiliary OLED 112 may be bonded to an upper end of the cathode 127.

Moreover, the sub-pixel 110 defined by the main OLED 111 and the auxiliary OLED 112 is separated from another sub-pixel adjacent thereto by a bank 125.

Hereinafter, a method of driving the organic light emitting display device according to an embodiment of the present invention will be described with reference to FIGS. 4(b) and 4(c). FIG. 4(a) is an exemplary diagram illustrating configurations of the driver 115, the main OLED 111, and the auxiliary OLED 112 which are formed in the sub-pixel 110. FIG. 4(b) is an exemplary diagram for describing a method in which all the main OLED 111 and the auxiliary OLED 112 emit light in the 2D mode. FIG. 4(c) is an exemplary diagram for describing a method where in the 3D mode, the main OLED 111 emits light, and the auxiliary OLED 112 does not emit light.

When a 2D mode input signal is received from the external system, the timing controller 400 generates a control signal CS which turns on the switching unit 116, and transfers the control signal CS to the switching unit 116.

The switching unit 116 is turned on by the control signal.

The driving current is transferred from the driver 115 to the main OLED 111 and the auxiliary OLED 112 by driving of the panel drivers 200, 300 and 400.

Since the driving current is directly transferred to the main OLED 111, the main OLED 111 emits light.

Since the switching unit 116 is turned on, the driving current is transferred to the auxiliary OLED 112 through the switching unit 116. Therefore, the auxiliary OLED 112 may also emit light.

That is, in the 2D mode, as illustrated in FIG. 4(b), the driving current is supplied to the main anode 124 of the main OLED 111 formed in the sub-pixel 110 and the auxiliary anode 128 of the auxiliary OLED 112 formed in the sub-pixel 110, and thus, the main OLED 111 and the auxiliary OLED 112 emit light.

When the 2D mode input signal is received from the external system, the timing controller 400 generates a control signal CS which turns off the switching unit 116, and transfers the control signal CS to the switching unit 116.

The switching unit 116 is turned off by the control signal.

The driving current is transferred from the driver 115 to the main OLED 111 and the auxiliary OLED 112 by driving of the panel drivers 200, 300 and 400.

Since the driving current is directly transferred to the main OLED 111, the main OLED 111 emits light. However, since the switching unit 116 is turned off, the driving current cannot be transferred to the auxiliary OLED 112 through the switching unit 116. Therefore, the auxiliary OLED 112 cannot emit light. In this case, the auxiliary OLED 112 performs a function of the black stripe.

Crosstalk based on a viewing angle can be reduced by the black stripe. That is, in the 3D mode, as illustrated in FIG. 4(c), the driving current is supplied to the main anode 124, and thus, the main OLED 111 emits light. However, since the driving current is prevented from being supplied to the auxiliary anode 128, the auxiliary OLED 112 cannot emit light.

According to the embodiments of the present invention, a user can view a 3D image at a broader up/down viewing angle, and can also view a brighter image even in the 2D mode. That is, an aperture ratio can be enhanced in the 2D mode.

Moreover, according to the embodiments of the present invention, a service life of the organic light emitting display device can be enhanced.

Moreover, according to the embodiments of the present invention, except that the main anode configuring the main OLED which emits light in both the 2D mode and the 3D mode is isolated from the auxiliary anode configuring the auxiliary OLED which emits light in only the 2D mode, a related art process of forming an OLED is identically performed. Accordingly, it is not required to add a new process.

Moreover, since the main anode and the auxiliary anode may be formed by the same manufacturing process as a related art anode manufacturing process, a process and the cost are not additionally required for forming the main anode and the auxiliary anode.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. An organic light emitting display device comprising:
an organic light emitting panel including a plurality of sub-pixels in which each of the plurality of sub-pixels includes a main organic light emitting diode (OLED) which emits light in a two-dimensional (2D) mode and a three-dimensional (3D) mode and an auxiliary OLED which emits light in only the 2D mode, wherein the auxiliary OLED and the main OLED both emit a same color of light;
a panel driver configured to drive the organic light emitting panel;
a driver provided in an intersection area between a gate line and a data line, and configured to include a plurality of transistors in each of the plurality of sub-pixels; and
a patterned retarder bonded to the organic light emitting panel, and configured to change polarizing characteristics of a left image and a right image which are output from the organic light emitting panel,
wherein the driver overlaps the main OLED and the auxiliary OLED and includes a driving transistor for driving the main OLED and the auxiliary OLED, and
wherein the main OLED and the auxiliary OLED are formed in a top emission type where the light is output to an outside through a cathode,
wherein the main OLED comprises a main anode, a light emitting material part formed on the main anode, and the cathode formed on the light emitting material part,
wherein the auxiliary OLED comprises an auxiliary anode electrically isolated from the main anode by a switch, and the auxiliary anode shares both the light emitting material part and the cathode with the main OLED,
wherein the plurality of sub-pixels are separated from each other by a bank and the main anode and the auxiliary anode within each of the plurality of sub-pixels are separated from each other by a portion of the light emitting material part disposed therebetween that does not overlap with the bank, and
wherein one end of the switch is connected between the main anode and the driving transistor, and another end of the switch is connected to the auxiliary anode of the auxiliary OLED, and the switch electrically connects or disconnects the main anode and the auxiliary anode according to a control signal transferred from the panel driver and activated during the 2D mode.

2. The organic light emitting display device of claim 1, wherein each of the plurality of sub-pixels comprises:
the main OLED configured to emit light with a driving current supplied from the driver;
the auxiliary OLED configured to emit light with the driving current; and
the switch configured to prevent the driving current from being supplied to the auxiliary OLED in the 3D mode, and supply the driving current to the auxiliary OLED in the 2D mode, according to the control signal transferred from the panel driver.

3. The organic light emitting display device of claim 1, wherein,
in the 2D mode, the main OLED and the auxiliary OLED simultaneously emit light with a driving current transferred from one driver which is provided in each sub-pixel, and
in the 3D mode, the main OLED emits light with the driving current, and the driving current is not supplied to the auxiliary OLED.

4. The organic light emitting display device of claim 3, wherein the main anode configuring the main OLED is directly connected to the one driver, and the auxiliary anode configuring the auxiliary OLED is connected to the one driver and the main anode through the switch.

5. The organic light emitting display device of claim 4, wherein the switch prevents the driving current from being supplied to the auxiliary OLED in the 3D mode, and supplies the driving current to the auxiliary OLED in the 2D mode, according to the control signal transferred from the panel driver.

6. A display device comprising:
a plurality of sub-pixels in which each of the plurality of sub-pixels includes a main organic light emitting diode (OLED) configured to emit light in a two-dimensional (2D) mode and a three-dimensional (3D) made, and an auxiliary organic light emitting diode (OLED) configured to emit light in only the 2D mode, wherein the auxiliary OLED and the main OLED both emit a same color of light;
a driver provided in an intersection area between a gate line and a data line, and configured to include a plurality of transistors; and
a patterned retarder configured to change polarizing characteristics of a left image and a right image,
wherein the driver overlaps the main OLED and the auxiliary OLED and includes a driving transistor for driving the main OLED and the auxiliary OLED, and
wherein the main OLED and the auxiliary OLED are formed in a top emission type where the light is output to an outside through a cathode,
wherein the main OLED comprises a main anode, a light emitting material part formed on the main anode, and the cathode formed on the light emitting material part,
wherein the auxiliary OLED comprises an auxiliary anode electrically isolated from the main anode by a switch, and the auxiliary anode shares both the light emitting material part and the cathode with the main OLED,
wherein the plurality of sub-pixels are separated from each other by a bank and the main anode and the auxiliary anode within each of the plurality of sub-pixels are separated from each other by a portion of the light emitting material part disposed therebetween that does not overlap with the bank, and
wherein one end of the switch is connected between the main anode and the driving transistor, and another end of the switch is connected to the auxiliary anode of the auxiliary OLED, and the switch electrically connects or disconnects the main anode and the auxiliary anode according to a control signal transferred from a panel driver.

7. The device of claim 6, wherein the switch prevents a driving current from being supplied to the auxiliary OLED in the 3D mode, and supplies the driving current to the auxiliary OLED in the 2D mode.

8. The device of claim 7, wherein the main anode is directly connected to the driver, and the auxiliary OLED is connected to the driver and the main anode through the switch.

9. An apparatus comprising:
a substrate; and
a plurality of self-luminescent pixels in an array or matrix formed on the substrate, each pixel having a plurality of sub-pixels, each sub-pixel having a combined configuration of a main organic light emitting diode (OLED) with an auxiliary organic light emitting diode (OLED), wherein the auxiliary OLED and the main OLED both emit a same color of light,
wherein the combined configuration of the main OLED and the auxiliary OLED provide a first aperture ratio for a two-dimensional (2D) mode of image displaying operation and a second aperture ratio for a three-dimensional (3D) mode of image displaying operation, with the first and second aperture ratios being different from each other,
wherein the main OLED and the auxiliary OLED are formed in a top emission type where the light is output to an outside through a cathode,
wherein the main OLED comprises a main anode, a light emitting material part formed on the main anode, and the cathode formed on the light emitting material part,
wherein the auxiliary OLED comprises an auxiliary anode electrically isolated from the main anode by a switch, and the auxiliary anode shares both the light emitting material part and the cathode with the main OLED,
wherein the plurality of sub-pixels are separated from each other by a bank and the main anode and the auxiliary anode within each of the plurality of sub-pixels are separated from each other by a portion of the light emitting material part disposed therebetween that does not overlap with the bank, and
wherein one end of the switch is connected between the main anode and the driving transistor, and another end of the switch is connected to the auxiliary anode of the auxiliary OLED, and the switch electrically connects or disconnects the main anode and the auxiliary anode according to a control signal transferred from a panel driver.

10. The apparatus of claim 9, wherein the main OLED is configured to operate both in the 2D mode and the 3D mode, and
wherein the auxiliary OLED is configured to operate only in the 2D mode, with the combined configuration allowing the first aperture ratio for the 2D mode to be greater than the second aperture ratio for the 3D mode.

11. The apparatus of claim 9, further comprising:
circuitry configured to control the sub-pixels in order to selectively output images either in the 2D mode or in the 3D mode.

12. The apparatus of claim 11, wherein a portion of the circuitry in combination with the auxiliary OLED are configured to act as or overlap with a black stripe pattern that is configured to provide various viewing angle characteristics for three-dimensional image viewing.

13. The apparatus of claim 12, wherein the circuitry during the 3D mode, is configured to provide appropriate driving current to the main OLED while not providing any driving current to the auxiliary OLED.

14. The apparatus of claim 13, wherein the circuitry includes the switch configured to provide, during the 3D mode, the appropriate driving current directly to only the main OLED and to keep the auxiliary OLED inactivated.

* * * * *